US006879997B1

(12) United States Patent
Ketola et al.

(10) Patent No.: US 6,879,997 B1
(45) Date of Patent: Apr. 12, 2005

(54) SYNCHRONOUSLY SHARED ONLINE DOCUMENTS

(75) Inventors: Pekka Ketola, Tampere (FI); Tea Liukkonen-Olmiala, Jaali (FI); Petri Ruutikainen, Tampere (FI); Kaisa Vaananen-Vainio-Mattila, Tampere (FI); Satu Kalliokulju, Vesilahti (FI)

(73) Assignee: Nokia Corporation, Espoo (FI)

( * ) Notice: Subject to any disclaimer, the term of this patent is extended or adjusted under 35 U.S.C. 154(b) by 498 days.

(21) Appl. No.: 09/722,616

(22) Filed: Nov. 27, 2000

(51) Int. Cl.[7] .............................................. G06F 15/16
(52) U.S. Cl. ........................ 709/208; 455/566; 455/517; 455/556.2; 709/214
(58) Field of Search ................................ 455/507, 517, 455/566, 556.2, 518, 519, 412.1, 416, 41.1, 41.2, 41.3; 709/208, 214–215, 212; 345/864, 963

(56) References Cited

U.S. PATENT DOCUMENTS

| 4,831,552 A |   | 5/1989  | Scully et al. |             |
|-------------|---|---------|---------------|-------------|
| 5,508,713 A | * | 4/1996  | Okouchi       | 345/2.2     |
| 5,583,993 A |   | 12/1996 | Foster et al. | 396/200.04  |
| 5,781,732 A |   | 7/1998  | Adams         | 395/200.035 |
| 5,831,664 A |   | 11/1998 | Wharton et al.|             |
| 5,928,329 A |   | 7/1999  | Clark et al.  | 709/227     |
| 5,946,633 A |   | 8/1999  | McAlinden     |             |
| 5,991,796 A |   | 11/1999 | Anupam et al. | 709/206     |
| 5,996,003 A | * | 11/1999 | Namikata et al.| 709/205    |
| 6,389,423 B1| * | 5/2002  | Sakakura      | 707/10      |
| 6,456,841 B1| * | 9/2002  | Tomimori      | 455/412.2   |
| 6,466,236 B1| * | 10/2002 | Pivowar et al.| 345/835     |
| 6,470,189 B1| * | 10/2002 | Hill et al.   | 455/517     |
| 6,553,037 B1| * | 4/2003  | Pivowar et al.| 370/463     |
| 6,553,228 B1| * | 4/2003  | Kotzin        | 455/434     |
| 6,650,629 B1| * | 11/2003 | Takahashi et al.| 370/335   |

FOREIGN PATENT DOCUMENTS

WO          9732439        9/1997

* cited by examiner

*Primary Examiner*—Simon Nguyen

(57) ABSTRACT

A communication system, method, and apparatus are described for synchronously sharing online documents within a wireless telecommunications network. The system allows a main information center and a mobile terminal to regularly and mutually update important data in synchrony. It also allows real time online document sharing for a mobile terminal with a wireless connection to other terminals. Furthermore, it allows real time online calendar sharing and group calendar sessions.

15 Claims, 5 Drawing Sheets

FIG. 5

|    | Monday  | Tuesday | Wednesday | Thursday | Friday | Saturday | Sunday |
|----|---------|---------|-----------|----------|--------|----------|--------|
| 8  |         |         |           |          |        |          |        |
| 9  | Meeting |         | Meeting   |          |        |          |        |
| 10 | Meeting |         |           |          |        |          |        |
| 11 | Meeting |         |           |          |        |          |        |
| 12 |         |         | Lunch     |          |        |          |        |
| 13 |         |         |           | Meeting  |        |          |        |
| 14 |         |         |           | Meeting  |        |          |        |
| 15 |         |         |           |          |        |          |        |
| 16 |         |         |           |          |        |          |        |

FIG. 6

|    | Monday | Tuesday | Wednesday | Thursday | Friday | Saturday | Sunday |
|----|--------|---------|-----------|----------|--------|----------|--------|
| 8  | Course |         |           |          |        |          |        |
| 9  | Course | Meeting |           |          |        |          |        |
| 10 | Course | Meeting |           |          |        |          |        |
| 11 | Course |         |           |          |        | Swim     |        |
| 12 | Course |         | Lunch     |          |        | Swim     |        |
| 13 | Course |         |           | Meeting  |        |          |        |
| 14 | Course |         |           | Meeting  |        |          |        |
| 15 |        |         |           |          |        |          |        |
| 16 |        |         |           |          |        |          |        |

FIG. 7

|    | Monday  | Tuesday | Wednesday | Thursday | Friday | Saturday | Sunday |
|----|---------|---------|-----------|----------|--------|----------|--------|
| 8  | Course  |         |           |          |        |          |        |
| 9  | Meeting | Meeting | Meeting   |          |        |          |        |
| 10 | Meeting | Meeting |           |          |        |          |        |
| 11 | Meeting |         |           |          |        | Swim     |        |
| 12 | Course  |         | Lunch     |          |        | Swim     |        |
| 13 | Course  |         |           | Meeting  |        |          |        |
| 14 | Course  |         |           | Meeting  |        |          |        |
| 15 |         |         |           |          |        |          |        |
| 16 |         |         |           |          |        |          |        |

SYNCHRONOUSLY SHARED ONLINE DOCUMENTS

TECHNICAL FIELD

This invention relates in general to the field of data sharing, especially to online shared documents in a mobile environment, to the field of remote synchronization in a mobile environment, and to the field of group calendar technology, particularly online shared functionality of calendars in a mobile environment.

DISCUSSION OF RELATED ART

The General Packet Radio Service (GPRS) for mobile telecommunications offers a third generation environment where data can be transferred transparently from and to a mobile terminal. Data traffic is becoming increasingly important in wireless networks. It is already overtaking voice in fixed networks, and may soon do so in wireless networks. The so-called third generation wireless system is expected to add the capabilities necessary to allow the simultaneous integration of voice and data traffic at high speeds and increased bandwidth. In the interim until the adoption of third generation systems supercedes the existing Global System for Mobile Communications (GSM), the GPRS is being introduced as an intermediate step with a range of supported bandwidths useful for e-mail, web browsing and large data transfers. GPRS also supports quality of service and fast connection setup so that the user has the perception of being continually on. Since in the GPRS network the terminal appears to be actively connected all the time, there is no need for the user to execute the steps formerly necessary to create, for example, a data call to transfer data—the data transfer is possible all the time. The situation where a device is effectively connected all the time gives many new opportunities compared to the current situation, where each data transfer must be preceded by a time-consuming set-up procedure. It should be realized that there are other ways of achieving high bandwidth using existing cellular data terminals, for instance, as shown in McAlinden (U.S. Pat. No. 5,946,633), where multiple data links can be created on the voice bands of cellular analog channels and dedicated to a single terminal, with flexible bandwidth as more or less bandwidth is required.

When two or more devices are connected there are a number of shared functions that they can perform together. The very basic case of this is a simple phone call, and a more advanced example of this is a terminal connection. One implementation of shared functions technology is a synchronously shared document, for example, text or a picture or a folder; throughout this disclosure, the word "document" is used in this broad inclusive sense. Document sharing is "synchronous" if it occurs between terminals in a specific time relationship, under control of a master clock, with a constant time between successively shared bits, characters, or events.

In fixed networks, document sharing is handled either with a document server (as in World Wide Web), with a dedicated groupware application, or simply by just copying the document from one device to another via a common file system. The methods that are currently used are functioning well in PC systems and distributed networks.

The obvious benefit of current systems is their upward scalability. It is easy to add users to the network, and a user need not be connected in order to provide a view for others of that user's data. However, current systems are not the optimal way to handle small groupings, like 2–3 persons. Also, the mobility of traditional systems is low. Furthermore, compared to the presently introduced system, there is no easy and reliable way to verify that the recipient is viewing exactly the same document.

A synchronously shared online document in a mobile environment means, for example, that a document which is open in a remote mobile terminal A can be transferred and viewed also at one or more other terminals which will receive not merely an initial snapshot of the terminal A document but a synchronous view of the document as user A manipulates or updates the document. Thus far there have been no creative solutions for mobile devices, like Personal Digital Assistants (PDAs) or communicators, for this kind of task. Documents that are created and stored in office systems can already be viewed by users of multiple personal computers, with editing commands being sent from participating terminals to the other participating terminals. See, for instance, Adams (U.S. Pat. No. 5,781,732). However, an arrangement has not been devised for a mobile terminal, in remote contact with either another mobile device or with a fixed system such as a PC, whereby a single mobile editor allows others to see a document synchronously as he alone makes edits.

There are several implementations in the related art to synchronize data between a mobile terminal and a fixed information center such as a PC. The main implementations are local user-initiated synchronization when devices are near each other, and remote synchronization using user-initiated or timed TCP/IP (Transfer Control Protocol/Internet Protocol) data connection. The benefit of local synchronization is that the connection is cheap and fast. The drawback of local synchronization is that the devices must be relatively near each other for infrared, low power radiofrequency (LPRF), or cable connection. The benefit of remote synchronization is that the devices can be in different locations, and the synchronization can be performed anytime. One drawback in remote synchronization is that the synchronization must be initiated from the mobile terminal, and it has to be user-initiated; the information center cannot be active for synchronization in current systems. The other drawback is that the synchronization is slow, and it interrupts all other user tasks. Generally, a drawback in current systems is that the mobile user can synchronize only contact information and calendars.

There have also been methods for synchronizing display of data relating to a predetermined application between an interactive terminal and at least one mobile interface device having a display. See Wharton et al. (U.S. Pat. No. 5,831,664). In that case, a remote central processing unit (CPU) supports one or more mobile users who interact with a single terminal-set that is coupled to a set-top transceiver. For example, the mobile users operate PDAs that interact via a remote CPU with a television terminal having a set-top box. According to Wharton, the CPU is the only remote component, and the mobile users are not remote from the interactive terminal or from each other. Wharton explains that the interactive television information enhances the experience of PDA users, but if a PDA user wants to go away from the television, then the PDA can be used as a stand-alone device. When the user wants to use both the PDA and the television, these two devices are kept in synchronicity by a synchronization signal emitted by the set-top box. The synchronization signal includes a first display control signal for controlling the display of the PDA and a second display control signal for controlling the display of the television. This synchronization signal causes the displays to show information in a synchronized manner to the user. Thus far there has been no solution to do likewise in a remote mobile environment.

An especially useful implementation of shared functions technology is a group calendar. There are several implementations for group calendars in office systems with networked PCs. Thus far there have been no creative solutions for mobile devices, like PDAs or communicators, for this kind of task. One existing implementation for calendar handling is the calendar reservation and request system that was introduced in the Nokia 90001 Communicator.

All group calendars and shared calendars thus far are based on an environment of networked personal computers in fixed networks and on the idea of one common calendar database in a server somewhere in the system.

The obvious benefit of a single "team calendar" is the upward scalability. It is easy to add users to a single group calendar and the users do not need to be connected in order to provide a view to others of their personal calendar data. However, a single group calendar is not the optimal way to handle small groupings, like 2–3 persons. Also the mobility of traditional group calendar systems is poor.

SUMMARY OF THE INVENTION

According to a first aspect of the invention, a mobile terminal is capable of being remotely and continuously connected to one or more other terminals, and all of these terminals repeatedly update each other so that all selected categories of data in each computer are revised uniformly. This entire process occurs automatically and synchronously without user disruption.

In this way, a mobile terminal stays synchronized with a main information center, for example a PC, using a network such as GPRS as a platform and with synchronization active all the time. Devices can keep track of the changes in each terminal's data storage and update the information regularly to the other terminal.

The information center and mobile terminal are not required to have a physical connection, and the synchronization can be executed anytime when changes are tracked. This is important, for example, when:
  the same documents must be available both in the office and while on the road all the time without an explicit need to update data contents at both ends;
  a lot of small data updates are needed in real time and the remembering of all tiny items becomes too difficult; or
  a user's calendar is updated while on the road and calendar events are also added by other persons.

According to a second aspect of the invention, a mobile terminal edits and controls a document, and has a remote link to one or more other terminals whereby those other terminals are given a real-time view of the document as it is discussed, scrolled, highlighted and/or edited. The remote discussion or conversation can be conducted orally, and simultaneously with the remote document sharing. A "remote" connection is understood to mean a wireless telephone connection.

In this solution, two or more mobile terminal users can share online and view a synchronously updated document that physically resides in one master mobile terminal. By a "master" terminal is meant a terminal which exclusively manipulates and exclusively controls a shared document. Because the document is simply controlled by one editor, instead of by a plurality of editors, it is straightforward for the editor to verify that he has exactly the document that he desires. In other words, the editor is the complete master of the shared document, and all of the other users are slaves.

It is easy to share a changing document with anyone that has the same technology platform, anywhere and anytime. There is no need for any larger computer environment to enable document sharing—all sharing is based on the phone call linking participants. Using a platform such as GPRS, it is possible to have an active voice call and real-time document sharing simultaneously in one telephone call.

According to a third aspect of the invention, a mobile terminal is capable of having a remote link to one or more other mobile terminals. Calendar data from each user terminal is exchanged, and then each terminal displays the superimposed calendars. Also, if third generation technology is used, the shared calendar can be simultaneously discussed while users update their individual calendars and thereby cause immediate and automatic updates to the superimposed display.

This solution allows two or more users to share and compare their calendars while at home, office, or on the road, using existing connection technologies. The implementation possibilities of this aspect of the invention will also improve when third generation mobile solutions become available, making it possible, for example, to conduct an active voice call before, during and after the calendar data exchange.

When two or more users have any kind of data connection between terminals, it is possible with second-generation technology to:
  1. Combine two or more calendar databases into one combined calendar database;
  2. show the superimposed calendars in all connected devices; and
  3. edit any of the individual user's calendars so that all terminals can obtain a revised superimposed display.

Calendar functionality can thereby be enhanced using existing technologies as Well as by using third generation technologies, or intermediate technologies like GPRS.

It is easy to share and compare calendars with anyone that has the same technology platform, anywhere and anytime. There is no need for larger technology arrangements, for example the internet, to enable calendar sharing—all sharing is based on the direct wireless telephone connection between participants.

The context of this invention is a wireless telecommunications system, which simply means that the invention is capable of being utilized via an ordinary wireless telephone call between the terminals that share documents. Additional systems or intermediaries, such as the internet, are unnecessary. The wireless telephone communications system in which this invention operates is the same system necessary to make any wireless telephone call.

The present invention offers a way of having an information center and a mobile terminal regularly and mutually update important data in synchrony.

The present invention enables real time online document sharing for a mobile terminal with a remote connection to other terminals.

The present invention enables real time online calendar sharing and group calendars for a mobile terminal with a remote connection to other terminals.

BRIEF DESCRIPTION OF THE DRAWINGS

FIG. 5 shows an example of one user's individual calendar.

FIG. 6 shows an example of another user's individual calendar.

FIG. 7 exemplifies how users would see the shared calendars superimposed.

BEST MODE FOR CARRYING OUT THE INVENTION

Figure 1:
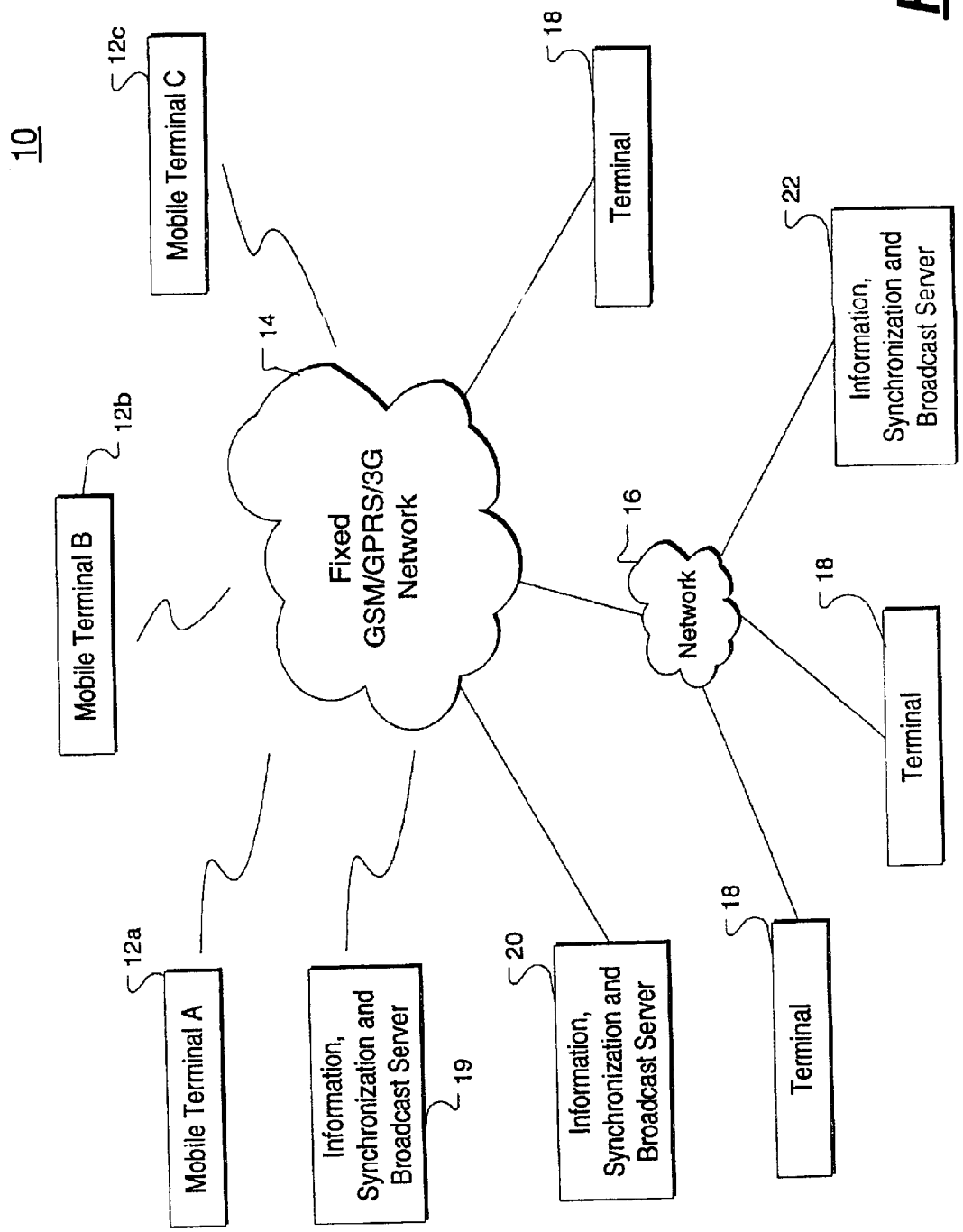
FIG. 1 shows a system and context for online document sharing, wherein documents may be shared between mobile terminals and between mobile terminals and fixed terminals.

FIG. 1 shows a system for sharing documents online between mobile terminals and between mobile terminals and fixed terminals. The system is preferably capable of simultaneously carrying voice conferencing between the mobile terminals and between the mobile terminals and the fixed terminals. The system 10 includes a plurality of mobile terminals 12a, 12b, 12c that communicate via a wireless mobile network 14 for the purpose of communicating among themselves and also for communicating with other networks, such as the network 16 illustrated in FIG. 1. The telephone call between terminals is preferably direct, meaning that contact with the Internet, or like packet networks, is not necessary and does not occur.

The network 14 may be any kind of wireless network, such as the known second-generation wireless network (GSM), a general packet radio service network (GPRS), a third-generation wireless network such as Universal Mobile Telecommunications System (UMTS), or a wireless Asynchronous Transfer Mode (ATM) network. It could even be an analog network of the first-generation type with the capability of utilizing high bandwidth cellular data terminals, such as shown in the above-mentioned U.S. Pat. No. 5,946,633. The mobile terminals 12a, 12b, and 12c include a graphical interface for presenting images, documents, and the like. They also include one or more input devices for calling up documents or images, for changing or annotating documents or images, and the like.

Similarly, the network 16 may be any kind of network, such as the public narrowband network including Signaling System 7 (SS7), a private or public X.25 packet-switched network, a public broadband network (SS7 and ATM), a private or public frame relay network, a private ATM network, the Internet, or any of the wireless networks mentioned above. Of course, it should be realized that there may be many other networks similar to the network 16 connected to the network 14 for providing context for, or for carrying out, the present invention. Terminals 18 are shown connected to the network 16, and these terminals may be fixed terminals, such as desktop computers, computers having Internet access, etc. These also have a display device and one or more input/output devices for enabling the viewing and changing of documents or images provided over the networks 14, 16.

According to the present invention, a given mobile terminal 12a is able to display a document on its display that is the same as the document in another mobile terminal 12b or fixed terminal 18. A "master" terminal exclusively manipulates: and exclusively controls any shared document, and the other terminals that share: the document can be thought of as "slaves" with respect to that document. Of course, a terminal can simultaneously be a master with respect to one shared document and a slave with respect to another shared document. Assuming that terminal 12a is a master terminal, then terminal 12a is the designated editor of the document, and this master mobile terminal 12a is thus the only terminal able to edit, change, annotate or otherwise manipulate the document. Any manipulation by mobile terminal 12a is communicated at about the same time to at least one terminal, which may be another mobile terminal 12b or may be a fixed terminal 18 with which the given mobile terminal 12a is in communication, but in any case is "remote" from terminal 12a in the sense that a wireless telephone connection is necessary to connect and share the document originating at terminal 12a.

Figure 2:
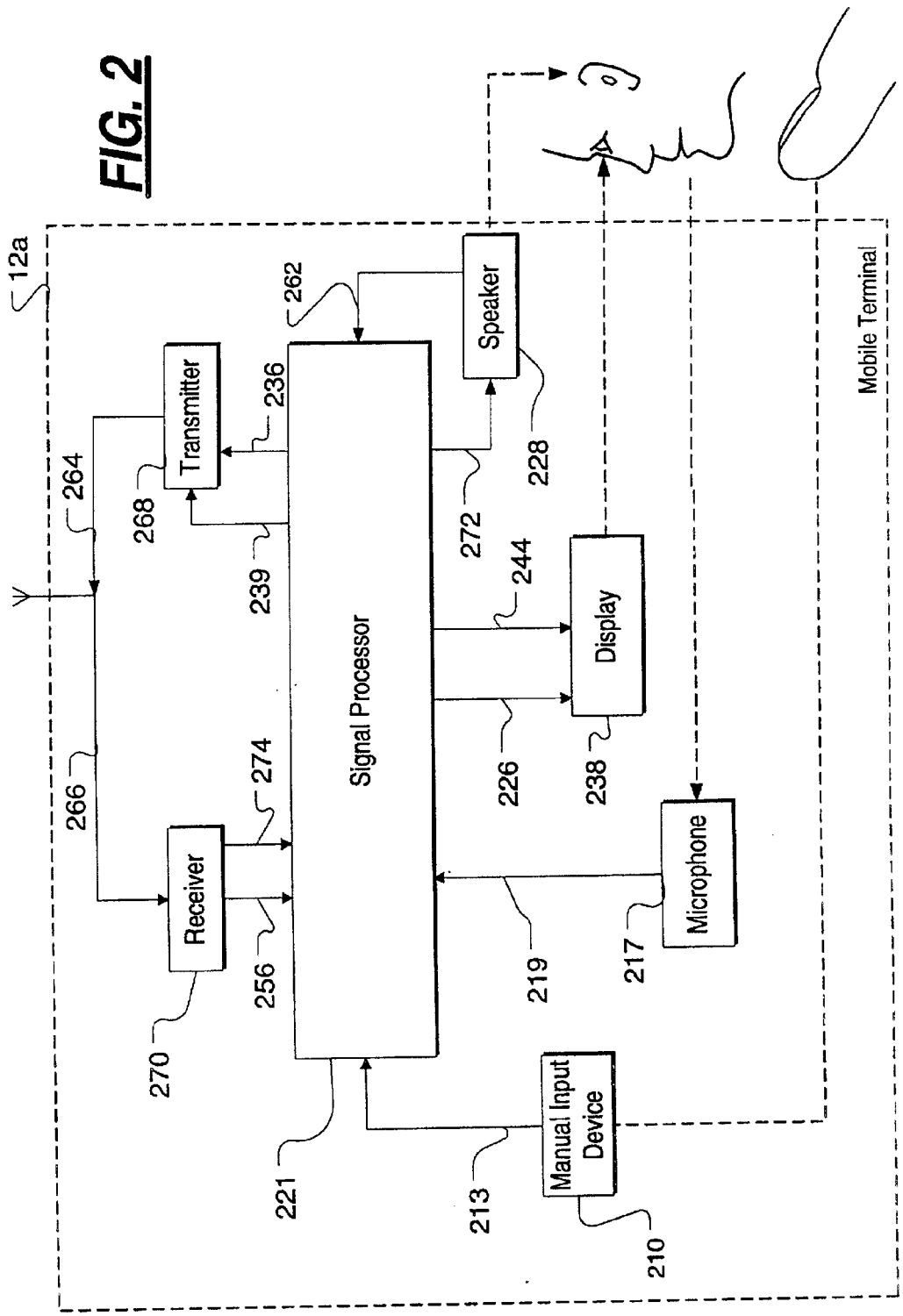
FIG. 2 shows a mobile terminal diagrammatically, including a signal processor.

The present invention can be viewed as a system within a larger wireless telecommunications system. Primary elements of the invention include at least one master mobile terminal 12a and at least one slave terminal 12b, as seen in FIG. 1. Each of the master terminals is responsive to user input, and, as seen in FIG. 2, is for providing an outgoing radio signal on a line 264. Among other things, the outgoing radio signal synchronously shares information about one or more internally controlled shared documents exclusively controlled by the master mobile terminal. The slave terminals are responsive to the outgoing radio signal on the line 264, and are designed to provide an external document display signal on a line 226, as seen in FIG. 2. The system of the present invention preferably also includes means for audio discussion simultaneous with real-time document sharing so that the signals on the lines 264, 266 also contain information relating thereto.

This communication is best accomplished by an information, synchronization and broadcast server 19, 20 or 22, which receives requests for online sharing of documents from mobile terminals or fixed terminals and facilitates the sharing by saving document information, by providing synchronization signals, and by broadcasting information, which broadcasted information may of course include text, images, or both. The information, synchronization and broadcast server thus facilitates sharing the document among multiple terminals, including two or more mobile terminals, or among one or more mobile terminals and one or more fixed terminals. As shown in FIG. 1, there may be one or more information, synchronization and broadcast servers 19, 20, 22, deployed throughout the system 10, including servers connected directly to the wireless network 14 by wire, fiber or radio and/or connected by wire or fiber to the network 16.

These multiple servers can be deployed throughout the system 10 in order to increase efficiency and availability of the services provided thereby. For example, one of these servers can be deployed as part of the master mobile terminal that functions as the document editor, either attached to or integrated with that master mobile terminal's signal processor 221 shown in FIG. 2.

An information, synchronization and broadcast server 19, 20, or 22 includes means for receiving a request from one of the mobile terminals 12a, 12b, or 12c or from a fixed terminal 18 for an online document sharing session. This request could, for instance, originate in a particular mobile terminal 12a such as shown in FIG. 2, wherein a user utilizes a manual input device 210 to signal that an online document sharing session is desired. Upon receiving the initial request for an online document sharing session, an application program within the server 19, 20, or 22 will then interact with the display in order to set up the requested document sharing session as the user instructs.

This invention should preferably have the capability to handle requests for online document or image sharing using various types of document application programs. A document may be a text document, a picture, a folder, or some other configuration, and, as mentioned previously, the word "document" is used throughout this disclosure in this broad sense. Therefore, a mobile terminal or server should preferably be equipped with a large number of application programs which can be called up upon receiving a request for a particular type of document or image sharing session. It will, of course, be realized that all signals involved in the sharing of documents may comprise a large plurality of back-and-forth signaling sequences, each carrying an amount of information concerning the nature of the setup, etc., all of which is well known to those of skill in the art and need not be detailed here.

The document to be shared can originate in one of the terminals, such as, one of the mobile terminals or fixed terminals, or can reside in a separate server 19, 20 or 22. If the document or image is first created in one of the terminals and the server receives a request for online sharing, the document must be communicated to the server and stored therein for purposes of communication to other terminals, some of which may join the session at different times, and the document can also be stored for future reference for use during future sharing sessions. In that case, the document need not be created again and can be used as a network resource by multiple terminal users, both fixed and mobile.

As explained previously, the terminal that originated a document-sharing request need not be a mobile terminal, but could be a fixed terminal originating the request for document or image sharing between itself and a mobile terminal. Likewise, the terminal that is the exclusive editor of the document may be different from the terminal that originates the document-sharing request, and the former terminal may initially need to receive the document from a third terminal before opening the document. Each component of this system, including each mobile terminal, should preferably include a synchronization device for ensuring that document-sharing occurs in a synchronous manner. Moreover, it is standard, in synchronous transmissions, for synchronization information to be sent along with the primary transmitted data, and such would be the case here.

The user of a slave mobile terminal 12b will preferably be free to save a snapshot of any shared document for his own future use, and an additional feature would allow any document-sharing terminal to obtain and save a continuous record of the evolution of the shared document. The mobile terminal 12a that is the designated editor or master of the shared document can preferably enable the user to use the manual input device 210 to edit, highlight, scroll or annotate the shared document or image. The manual input device 210 may include a keyboard, a mouse, and/or other devices operated by hand. The resulting document changes are immediately displayed for the user's observation on his own display 238, while at the same time the changes are communicated to users elsewhere. The ensuing process of communicating the changes is accomplished with various software and hardware components including, for example, document sharing application programs, controllers, and servers. This document-sharing process may all be accompanied by voice discussion going on simultaneously on a conference channel available to all participants, and preferably there will be means for written discussion (e.g. suggested text being sent to the editor).

In this invention, only one user serves as the exclusive editor of a shared document, as described above. Changes to the document can only be made by the editor, although the other terminals can of course send suggestions. This simple structure is intentional, whereas a more complicated collaborative process, involving a plurality of editors for a single document, can usually result in a hardware structure which is more complex than needed for presently envisioned mobile terminals. Thus, when any terminal displays a shared document, the document is either an exclusively internally controlled shared document or an exclusively externally controlled shared document.

Figure 3:
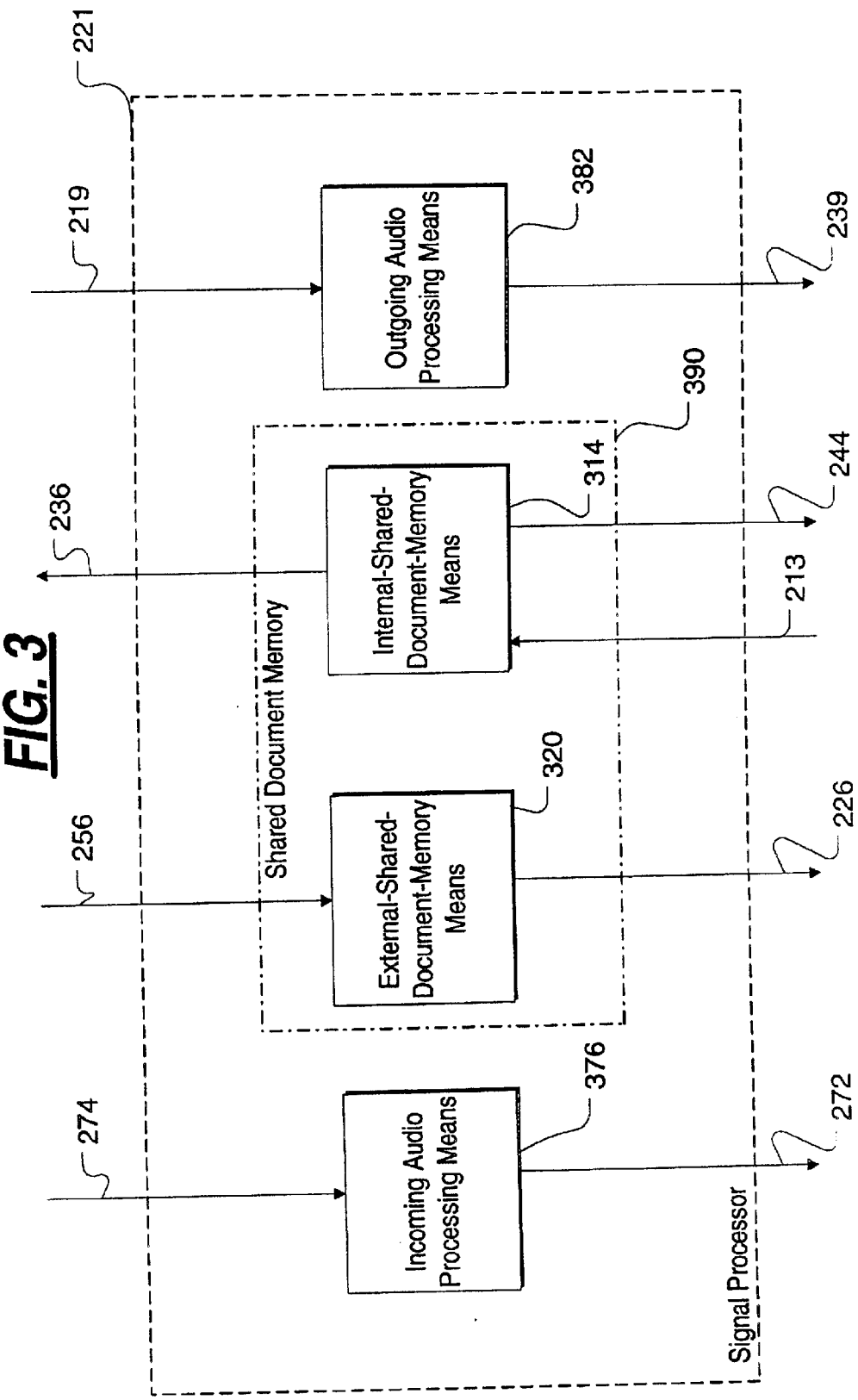
FIG. 3 shows certain pertinent features of a mobile terminal's signal processor.

As seen in FIG. 2, the invention includes a mobile terminal 12a equipped with an antenna for transmitting the outgoing radio signal on the line 264 and for receiving the incoming radio signal on the line 266, in a wireless telecommunications system. The mobile terminal 12a includes an input device 210 which is responsive to user input and is for providing an internal document manipulation signal on a line 213. The internal document manipulation signal is for exclusively manipulating at least one internally controlled shared document that is synchronously shared with at least one other terminal. The mobile terminal 12a of FIG. 2 also includes a receiver 270 that is responsive to the incoming radio signal on the line 266, and which is for forwarding an external-document-manipulation signal on a line 256 to a signal processor 221. This external document manipulation signal is for exclusively manipulating at least one externally controlled shared document that is synchronously shared with the other terminal or terminals. The mobile terminal further includes the signal processor 221, responsive to the external document manipulation signal on the line 256 and the internal document manipulation signal on the line 213. The signal processor 221 is for providing a synchronized internal document sharing signal on a line 236 which basically conveys information to a transmitter 268 about a document exclusively controlled by terminal 12a. The signal processor is also for providing an internal document display signal on a line 244, and an external document display signal on a line 226, both of which signals simply carry to a display 238 the information necessary to display shared documents which are internally or externally controlled, respectively. Although the signals on the lines 226, 244 are shown as separate signal lines, in reality they will most likely be a single line. The transmitter 268 provides: the outgoing radio signal on the line 264. The display 238 provides visual communication to the user. In addition to these basic components, the mobile terminal 12a of this invention also preferably includes a speaker 228, which is responsive to a speaker signal on a line 272 from the signal processor 221, the speaker providing audio output to the user. The signal processor provides this speaker signal on the line 272 in response to a received audio signal on a line 274 from the receiver 270. All of this is illustrated in FIGS. 2 and 3. The terminal also includes a microphone 217 for providing an audio input signal on a line 219 to the signal processor 221, which causes the signal processor to emit an outgoing audio signal on a line 239 to the transmitter. Preferably, this mobile terminal 12a is capable of supporting an audio conversation in real time, simultaneously with real time document sharing. The mobile terminal 12a is also preferably capable of being a slave terminal and a master terminal concurrently, with respect to different shared documents (i.e. a slave terminal with respect to one or more documents, and a master terminal with respect to one or more different documents). However, the mobile terminal 12a may alternatively be capable of being a slave and a master terminal only at different times. Still another possibility would be for a mobile terminal 12a to be only capable of being a slave terminal or only capable of being a master terminal.

FIG. 3 shows some of the inner workings of the signal processor 221. For instance, FIG. 3 shows an incoming audio processing means 376 which takes the received audio signal on the line 274, processes it, and yields the speaker signal on a line 272. This audio processing may include decoding, synthesizing, and other typical or even atypical audio processes. Likewise, the outgoing audio processing means 382 takes the audio input signal on the line 219, applies audio processes such as encoding, and produces the outgoing audio signal on the line 239.

It should be noted that the actual hardware inside of the signal processor 221 is not described in FIG. 3. However, a typical general purpose signal processor architecture would suffice. This would include the usual central processing unit (CPU), random access memory (RAM), read only memory (ROM), address bus, data bus, control bus, and input/output port. In that case, the invention is accomplished using appropriate software document sharing application programs. The present invention could be implemented using equivalent discrete or dedicated hardware.

Observe that the signal processor 221 of FIG. 3 contains a memory unit 390 which includes both an external shared document memory means 320 and an internal shared document memory means 314. The external memory 320 stores shared documents that are controlled by other terminals, whereas the internal memory 314 stores shared documents that are controlled by the terminal 12a. Of course, the mobile terminal 12a may also comprise memory means for storing documents that are not shared. In any case, as can be seen from FIG. 3, the signal on the line 256 entering the external memory and the signal on the line 213 entering the internal memory are respectively the external-document-manipulation signal and the internal-document-manipulation signal mentioned previously. Likewise, the signals exiting the memory 390 have already been described above.

Figure 4:
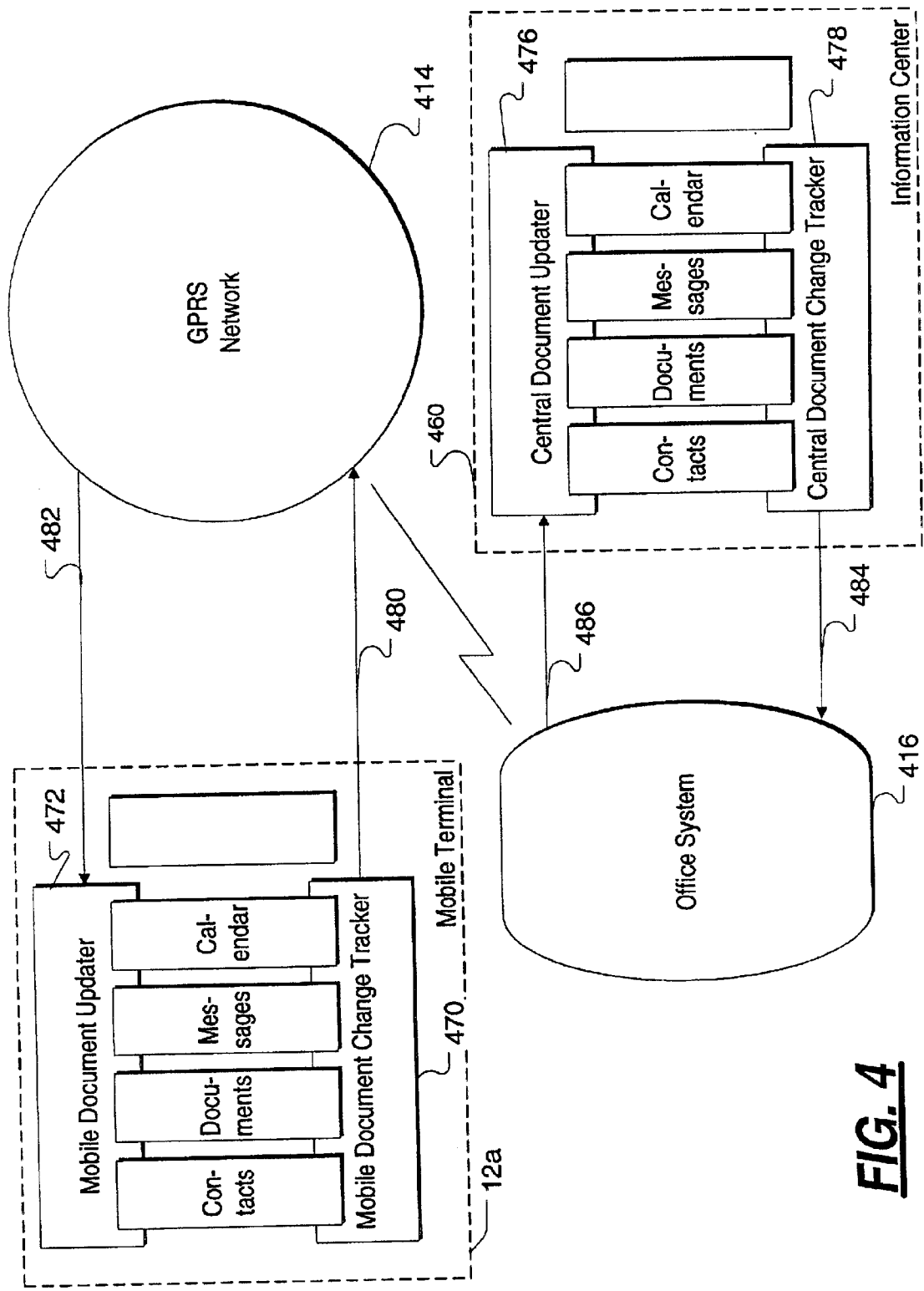
FIG. 4 shows a mobile terminal connected to an information center.

In a preferred embodiment of this invention, the external memory means 320 includes a group of documents that mirrors a group of documents at an information center 460 shown in FIG. 4, the group of documents being updated to keep pace with whatever changes are made at the information center. With respect to a given shared document or a document sharing session, the mobile terminal and, the information terminal shown in FIG. 4 have exactly similar data contents. FIG. 4 shows an example where the similar data contents are "contacts", "messages", "calendar", and other "documents." There are also unlabelled contents in FIG. 4 symbolizing that each terminal may contain documents that are not shared and are not similar; in other words, it will be understood that the shared data in the fixed information center 460 may be only a subset of the information center's whole data storage, and likewise for the mobile terminal 12a. It will also be understood that this process can operate in reverse, with the information center 460 behaving as the slave and the mobile terminal 12a behaving as the master, with respect to some documents.

The mobile terminal device 12a can be connected to the information center 460 in the way that is described in FIG. 4; i.e., it can be connected to the network via a GPRS or third generation connection and then to the information center 460 via an office system 416. A mobile document change tracker 470 is included in, or integrated with, the mobile terminal device 12a, and the mobile document change tracker 470 can keep track of any user-designated internal data in the mobile device 12a that is changed. For example, calendar events are added, new or revised documents are saved, a contact database is changed or new messages are received, and these changes are reported by the mobile document change tracker 470 which sends a mobile document change signal on a line 480. The information center 460 can replicate all of these changes, in response to a mobile document update signal on a line 486. Thus, the information center 460 maintains a subset of central changing documents that mirrors documents being edited at the master mobile terminal.

The information center has a similar functionality. Its central document change tracker 478 identifies and monitors changes in a designated subset of central storage documents that occur within the information center 460, and sends a central change signal on a line 484; subsequently, those changes are implemented by a mobile document updater 472 in response to a central update signal on a line 482. The mobile document updater 472 synchronously updates each designated shared document in the mobile terminal, as that document is manipulated or changed at the information center, or at any terminal having exclusive control of the shared document.

While changes in the mobile terminal data are observed, the changes are immediately, or after certain periods, sent to a central document updater 476 located at the information center 460, and similarly when any changes in the information center data are observed, they are immediately, or after certain periods, updated to a mobile document updater 472 at the mobile terminal. These synchronous updates can happen transparently without users observing any interruption in either: the mobile terminal or the information center performance.

Referring again to FIG. 4, it will be realized that the combined information center 460 and office system 416 can be carried out on the server 19 such as shown in FIG. 1, which could be fixed or mobile. In FIG. 4, the mobile terminal 12a is connected to a GPRS network (or similar). The office system in this example has a connection to the GPRS network. The information center 460 may have a standard connection, for example TCP/IP, to the local office system 416.

When users are sharing any document, it is vital that synchronous updating occurs in real time, or approximately real time, because documents are open and being viewed. Therefore, in such a case, the updates have to occur with a frequency sufficient to track changes occurring at negligible time intervals. However, mutual data updates with an information center can occur less frequently if the data is not being accessed by users. The important point is that the updating occur automatically without disturbing the user. If there is an attempt by the mobile terminal and the central terminal to simultaneously change the same file, then one of the terminals can display an instruction that the file is already open and unavailable for editing.

It should be reiterated that when two or more mobile devices have a data connection, it is possible to transfer any digital data between them. This data can be, for example, text or image. If it is possible to have a voice connection simultaneously with a data connection, then the situation where users view the same document and talk about it is possible.

For instance, the following scenario could occur: Jack calls Jill to talk about the latest sales offer. When they have a voice connection, Jack opens the sales offer document in his terminal device and clicks on or presses a "Share Document" button. Jill receives the document instantly into her terminal and sees the information while Jack points out interesting items and scrolls in the original document. Jill wants to have the document for further reading, and she clicks on or presses "Save" to get the document stored into her device. Here Jack has exercised the prerogatives of editor.

FIGS. 5 and 6 show the normal situation when there are user calendars for two different users, let's call them Jack and Jill, respectively. Jack makes a phone call to Jill with his Personal Digital Assistant terminal (PDA) in order to agree to a meeting time. In this example, both terminals are functioning as calendar editor terminals. During connection, they both press a "Share Calendar" button and then each terminal accesses the calendar which is solely and exclusively edited by the other terminal. Each terminal then superimposes the two calendars (FIG. 7), using a different format for one of the calendars in order to help distinguish them. For example, Jack's calendar could appear in regular font and Jill's in italics, or the two calendars could appear in different colors when superimposed. From the superimposed calendars it is easy for Jack and Jill to see what calendar events are overlapping and when they have a common opportunity to have a meeting.

During the telephone call, they agree to a meeting on Wednesday at 10 a.m. This meeting can be added by either Jack or Jill. When the call is ended, they both have their own individual calendar data in the calendar view as annotated to include the Wednesday meeting at 10 a.m. In this calendar-sharing application, it is appropriate for Jack to have the exclusive editing capability over his calendar while Jill has the exclusive editing capability over her calendar.

The invention described thus far can, as discussed, handle calendar sharing including the following features. When there is a connection between terminals and users request calendar sharing, the calendar data can be selected for a particular time frame, and then it can be read from connected devices to one server where the calendar data is gathered. The gathered data then can be sent to the terminals which show the superimposed calendars. When the connection is closed, the original individual calendar data can be returned. Implementing any kind of traditional calendar functionality is easy using the described method and will become fast and fluent using GPRS.

It should be understood that to best enable shared documents, users must use the same or compatible technology platforms. As described in the above calendar sharing scenario, if terminals are using 3rd generation technology, or its precursor GPRS, it is possible to have an active voice call and document sharing simultaneously and on-line. Superimposed calendars will change in real time as each editor changes the respective user calendar. Similar live online functionality is not possible in current second-generation environments.

The system might handle document sharing in the following way, given a connection between two mobile terminals 12a and 12b. When a user requests document sharing for an open document, the document data is sent from mobile terminal 12a to mobile terminal 12b directly, without any separate intermediate server. The functions of the server are integrated into terminal 12a. In other words, the synchronization signal for this embodiment does not come from a separate server but rather from the synchronization source in one of the mobile terminals. Terminal 12b receives the document and opens it in an appropriate viewer. The functionality of the document sharing application program, in conjunction with the synchronization source, offers synchronous signaling and document handling tools enabling such features as remote pointing, scrolling and emphasizing. Using GPRS, this sharing of documents will be fast and fluent. Likewise, if terminals are using third generation technology or GPRS, it is possible to have an active voice call and calendar combining simultaneously and on-line, but if current second generation technologies are used, instead of third generation technology, then similar calendar functionality can still be achieved by using Short Message Service (SMS), for example.

It should be recognized that each signal described in this disclosure is defined broadly as a cause and effect relationship. The signal may be direct or indirect, may comprise any number of intermediate steps, and may be integrated together with other signals, as will be understood by those skilled in the art.

Although this invention has been shown and described with respect to a best mode thereof, it should be understood by those skilled in the art that the foregoing and various other changes, omissions and additions in the form and detail thereof may be made therein without departing from the spirit of the invention and the scope of the claims.

What is claimed is:

1. A system, within a wireless telecommunications network, comprising:
   at least one master mobile terminal (12a), each of which is responsive to user input, and each of which is for providing an outgoing radio signal (264), wherein the outgoing radio signal synchronously shares information about at least one internally controlled shared document that is exclusively controlled by the master mobile terminal; and
   at least one slave terminal (12b or 18), responsive to the outgoing radio signal (264), for providing an external document display signal (226),
   wherein the external document display signal provides a synchronous view of the internally controlled shared document as the master terminal manipulates or updates the internally controlled shared document.

2. The system as in claim 1, further comprising means for audio discussion simultaneous with real-time document sharing.

3. A mobile terminal (12a) equipped with an antenna for transmitting an outgoing radio signal (264) and for receiving an incoming radio signal (266), in a wireless telecommunications system, comprising:
   an input device (210), responsive to user input, for providing an internal document manipulation signal (213), wherein the internal document manipulation signal is for exclusively manipulating at least one internally controlled shared document that is synchronously shared with at least one other terminal (12b or 18);
   a receiver (270), responsive to the incoming radio signal (266), for forwarding an external document manipulation signal (256), wherein the external document manipulation signal is for exclusively manipulating at least one externally controlled shared document that is synchronously shared with the at least one other terminal;
   a signal processor (221), responsive to the external document manipulation signal (256) and the internal document manipulation signal (213), for providing a synchronized internal document sharing signal (236), an internal document display signal (244), and an external document display signal (226);
   a transmitter (268), responsive to the synchronized internal document sharing signal (236), for providing the outgoing radio signal (264); and
   a display (238), responsive to the internal document display signal (244) and the external document display signal (226), for providing visual communication to the user,
   wherein the visual communication provides a synchronous view of the at least one externally controlled shared document as the at least one other terminal manipulates or updates the at least one externally controlled shared document.

4. The mobile terminal (12a) of claim 3, wherein the mobile terminal is capable of being a slave terminal and is also capable of being a master terminal, with respect to different shared documents concurrently.

5. The mobile terminal (12a) of claim 3, wherein the mobile terminal is capable of being a slave terminal and is also capable of being a master terminal, but at different times only.

6. The mobile terminal (12a) of claim 3, wherein:
the mobile terminal further comprises a speaker (228), responsive to a speaker signal (272), for providing audio output to the user;
the mobile terminal further comprises a microphone (217), responsive to oral input, for providing an audio input signal (219);
the receiver is also for providing a received audio signal (274);
the signal processor is also responsive to the received audio signal: (274), and responsive to the audio input signal (219), and is also for providing an outgoing audio signal (239), and for providing a speaker signal (272); and
the transmitter is also responsive to the outgoing audio signal (239).

7. The mobile terminal of claim 6, wherein the mobile terminal (12a) is capable of supporting an audio conversation in real time, simultaneously with real time document sharing.

8. The mobile terminal of claim 6 wherein the signal processor (221) comprises:
external shared document memory means (320), responsive to the external document manipulation signal (256), for providing the external document display signal (226);
internal shared document memory means (314), responsive to the internal document manipulation signal (213), for providing the internal document display signal (244) and for providing the synchronized internal document sharing signal (236);
incoming audio processing means (376), responsive to the received audio signal (274), for providing a speaker signal (272); and
outgoing audio processing means (382), responsive to the audio input signal (219), for providing the outgoing audio signal (239).

9. The mobile terminal (12a) of claim 3, wherein the display (238) is capable of superimposing the at least one internally controlled shared document with the at least one externally controlled shared document, thereby allowing two or more documents controlled by different controlling terminals (12a and either 12b or 18) to be superimposed over each other.

10. The mobile terminal (12a) of claim 9, wherein the at least one internally controlled shared document and the at least one externally controlled shared document comprise calendar documents, wherein the calendar documents are superimposed in real time, and wherein the display changes in real time as the controlling terminals respectively manipulate the calendar documents.

11. A mobile terminal (12a) equipped with an antenna for transmitting an outgoing radio signal (264) and for receiving an incoming radio signal (266), in a wireless telecommunications system, comprising:
an input device (210), responsive to user input, for providing an internal document manipulation signal (213), wherein the internal document manipulation signal is for exclusively manipulating at least one internally controlled shared document that is synchronously shared with at least one other terminal (12b or 18);
a receiver (270), responsive to the incoming radio signal (266), for forwarding an external document manipulation signal (256), wherein the external document manipulation signal is for exclusively manipulating at least one externally controlled shared document that is synchronously shared with the at least one other terminal;
a signal processor (221), responsive to the external document manipulation signal (256) and the internal document manipulation signal (213), for providing a synchronized internal document sharing signal (236), an internal document display signal (244), and an external document display signal (226);
a transmitter (268), responsive to the synchronized internal document sharing signal (236), for providing the outgoing radio signal (264); and
a display (238), responsive to the internal document display signal (244) and the external document display signal (226), for providing visual communication to the user,
wherein the signal processor (221) comprises:
external shared document memory (320), responsive to the external document manipulation signal (256), for providing the external document display signal (226); and
internal shared document memory (314), responsive to the internal document manipulation signal (213), for providing the internal document display signal (244) and for providing the synchronized internal document sharing signal (236).

12. The mobile terminal of claim 11, wherein the external shared document memory means (320) is capable of including a group of synchronously updated documents which mirrors a corresponding group of documents at an information center (460), said at least one other terminal (12b or 18) comprising said information center (460), and said at least one externally controlled shared document comprising said group of synchronously updated documents.

13. The mobile terminal of claim 11, wherein the internal shared document memory means (314) is capable of including a group of internal documents which is mirrored by a corresponding group of documents at an information center (460), said at least one other terminal (12a or 18) comprising said central information center (460), and said at least one internally controlled shared document comprising said group of internal documents.

14. A method of sharing information in a wireless telecommunications network, comprising the steps of:
providing an outgoing radio signal (264) in response to user input, wherein the outgoing radio signal synchronously shares information about at least one internally controlled shared document, and providing an external document display signal (226) in response to the outgoing radio signal (264),
wherein the external document display signal provides a synchronous view of the internally controlled shared document as the internally controlled shared document is manipulated or updated.

15. The method of claim 14, further comprising the step of conducting audio discussion simultaneous with real-time document sharing.

* * * * *

UNITED STATES PATENT AND TRADEMARK OFFICE
CERTIFICATE OF CORRECTION

PATENT NO. : 6,879,997 B1
DATED : April 12, 2005
INVENTOR(S) : Ketola et al.

It is certified that error appears in the above-identified patent and that said Letters Patent is hereby corrected as shown below:

Column 13,
Line 22, after "signal", please cancel ":".

Signed and Sealed this

Nineteenth Day of July, 2005

JON W. DUDAS
*Director of the United States Patent and Trademark Office*